May 8, 1928.

W. W. MUIR 1,668,817

HYDRAULIC POWER APPLIANCE

Filed Aug. 16, 1922

W. W. Muir
Inventor
by
Attorney

May 8, 1928.  
W. W. MUIR  
HYDRAULIC POWER APPLIANCE  
Filed Aug. 16, 1922

W. W. Muir  
Inventor

Patented May 8, 1928.  1,668,817

UNITED STATES PATENT OFFICE.

WELLINGTON W. MUIR, OF LOCKPORT, NEW YORK, ASSIGNOR TO HARRISON RADIATOR CORPORATION, OF LOCKPORT, NEW YORK.

HYDRAULIC-POWER APPLIANCE.

Application filed August 16, 1922. Serial No. 582,214.

This invention relates to a mechanical movement of the hydraulic type which is capable of a wide application, and has for its object to provide a means which will be simple in construction and more efficient in action than those heretofore proposed.

With these and other objects in view the invention consists in the novel details of construction and arrangement of parts more fully hereinafter disclosed and particularly pointed out in the claims.

Referring to the accompanying drawings forming a part of this specification, in which like numerals designate like parts in all the views:—

Figure 1:
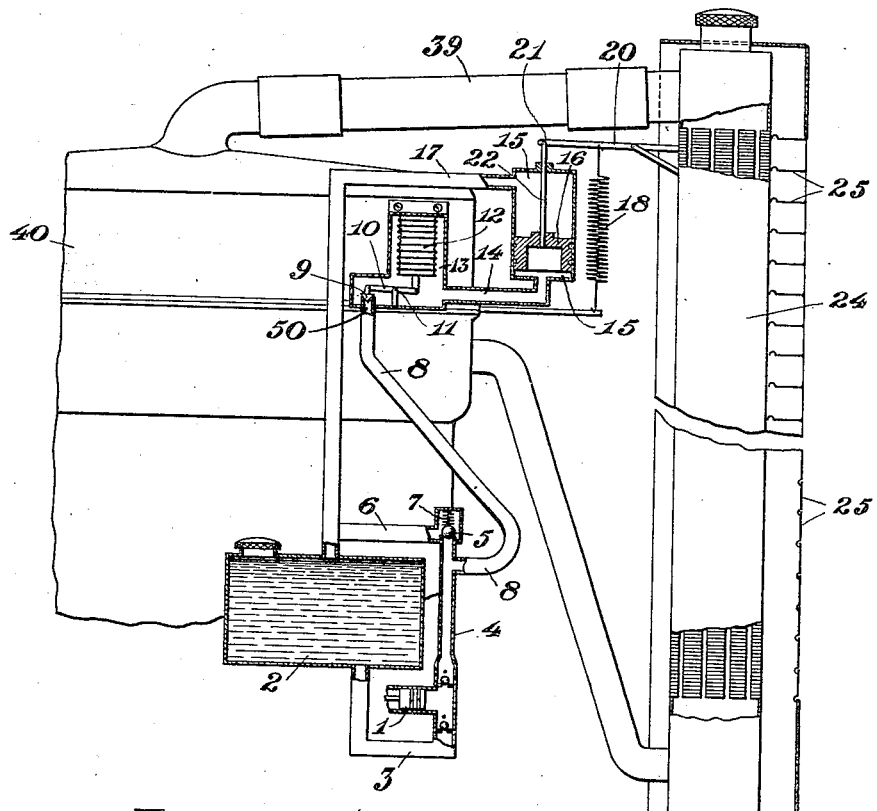
Figure 1 is a diagrammatic partially sectional view of the hydraulic power appliance device made in accordance with this invention, and applied to a cooling system for internal combustion engines.

1 indicates any suitable pump adapted to draw liquid from tank 2 through pipe 3 and force it through pipe 4 past the valve 5, through pipe 6, and back into tank 2. The valve 5 is controlled or loaded by the spring 7, the compression of which may be adjusted by means not shown, and a portion of the liquid passing through pipe 4 will be deflected into pipe 8 depending upon the force of said spring 7 and the degree of opening of a valve 9. Restricting means, comprising a ball valve shown in Figure 1 but not numbered, disposed to one side of the pump 1 in the pipe 4 and caged therein as by the pin thereabove, prevents any backward flow of liquid and thus insures a positive directional flow created by the pump 1. Said valve 9 is carried by a lever 10 pivoted at 11 which is controlled by a thermostat 12 or other controlling means. Said thermostat 12 is located in a chamber 13 from which leads the pipe 14 entering the cylinder 15. In the cylinder 15 is the loosely fitting piston 16 adapted to permit water or other fluid to leak past the same and enter the pipe 17 leading back to the tank 2. 18 is a spring attached to a rod 20, joined at 21 to the piston rod 22 and adapted to return piston 16 after it has been raised.

From the mechanism so far disclosed it will be clear that any desired portion of the water in the pipe 4 may be deflected into pipe 8 by regulating the compression of spring 7, provided no resistance is met with in said pipe 8. And further, if such resistance is met with, such as that due to a restriction exerted by the valve 9, the result is that a less proportion of water for each unit of time flows in pipe 8. But unless pipe 8 is entirely closed some liquid will flow therethrough in each unit of time and therefore, as time goes on, the total of said liquid may be any amount desired. The total pressure on the piston 16, supposing the same to be liquid tight, would depend upon the proportion its area bears to to the area of the inlet controlled by the valve 9. That is, the principle of a hydraulic jack would exist, and be modified by the amount of leakage past said piston 16 into pipe 17. But since the liquid through a relatively small orifice continuously flows into a relatively large chamber like the cylinder 15, a very great force and power will ultimately be exerted by the piston 16, and this power may be used for a great variety of purposes.

In Figure 1, said power is exerted through the pivoted bar 20, and by suitable connections not shown, may be utilized to operate the shutters 25 with which the radiator 24 is provided.

The form of the invention disclosed in Figure 2 embodies the same principles as that above disclosed, but the arrangement of parts differs in the following particulars. The pump 30 is of a different type, the pipe 8 leads to the tank 31 and its discharge orifice is controlled by the thermostatic valve 32. A similar thermostatic valve 33 controls the exit from said tank 31 into pipe 34 leading back to tank 2. The pipe 14 connects with the bellows like receptacle 35 whose movable end takes the place of piston 16 in Figure 1. It therefore results that a small quantity of water under a fixed pressure will flow through a small orifice into a relatively large chamber 35 having a movable wall, and that the action of a hydraulic jack will take place on the rod 20, which may be utilized to operate the shutters 36 of a radiator 37, or said rod 20 may be applied to any other suitable purpose.

Figure 2:
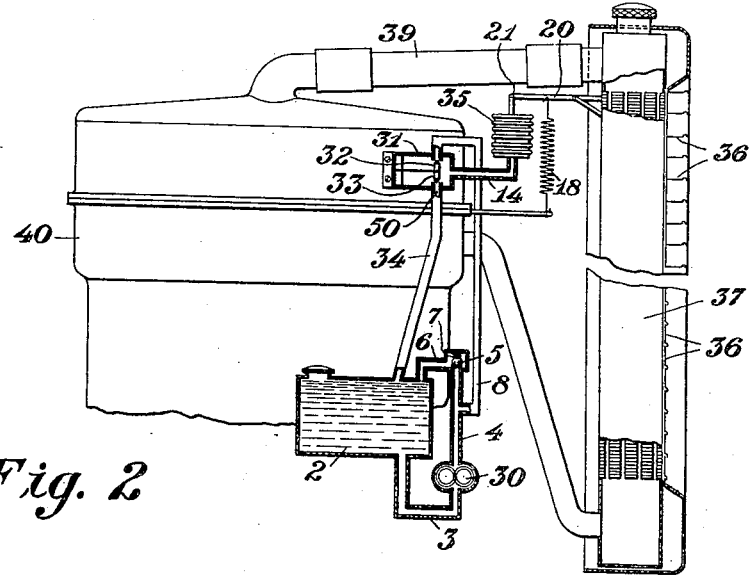
Figure 2 is a view similar to Figure 1, but showing a somewhat modified arrangement of parts.
Figure 3:
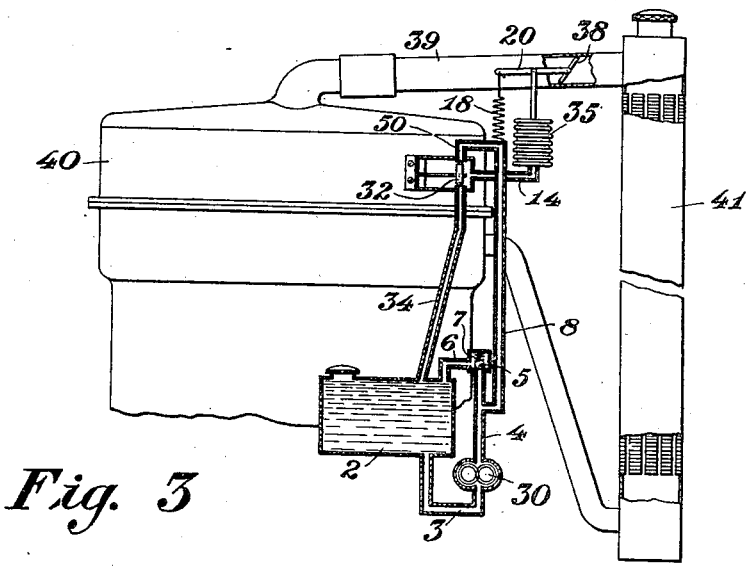
Figure 3 is a view similar to Figure 2, but showing a still further modified arrangement of parts.

In the form of the invention shown in Figure 3, the construction is the same as in Figure 2, except the operating rod 20 is applied to the control of a throttle valve 38 in the pipe 39 leading from the jacket of the motor 40 to the radiator 41.

It will now be clear that in each form of the invention a constant supply of liquid is furnished to each pipe 8 by a continuously operating pump from a closed circuit, communicating with the tank 2. It will further be clear that the area of the exit orifice 50 of each pipe 8 is much less than the area of the piston 16 in the cylinder 15, and also less than the areas of the movable walls in each of the bellows like chambers 35, so that the total pressure that is finally generated on said piston or equivalent movable walls is many times the pressure of the fluid in the pipes 8. It will also be clear that the pressure in each of the pipes 8 may be manually controlled by adjusting the compression of the springs 7 controlling their corresponding valves 5 and also automatically controlled by the thermostatic devices 12 and 32. It therefore results that by this invention one may exert a very largely increased pressure on the operating rods 20 and therefore, operate under thermostatic control, shutters such as 25 and 36 or a valve such as 38 which could not ordinarily be operated without employing a much heavier and more costly apparatus. That is to say, shutters of the type illustrated are now ordinarily operated by thermostats, but so great is the variation in the friction in the shutters that the thermostats of necessity are retarded in their operation of said shutters, with the result that the temperature of the cooling system rises much higher than is desired, or it cools to a much lower point than can be safely tolerated.

With this invention, on the other hand, the thermostats are called on to do comparatively little work, and therefore, the temperature control is kept within comparatively narrow limits, notwithstanding the friction of the shutters impose varying loads on the rods 20. It thus differs materially from those thermostatic devices which are calibrated to positively operate shutters at given temperatures and which have the very serious objection that when the shutters rust for example, the calibration is entirely incorrect. In this invention, whether the shutters rust or not, whether they become jammed or not, or whether the friction increases or decreases through changes in temperature or not, the rods 20 will receive such varying powers that the shutters will be operated at the desired temperature.

It is obvious that those skilled in the art may vary the details of construction as well as the arrangement of parts without departing from the spirit of the invention, and therefore, I do not wish to be limited to the above disclosure except as may be required by the claims.

What is claimed is:—

1. In a device of the character described the combination of a closed liquid circuit including a tank; a loaded valve controlling said circuit; means for circulating a liquid around said circuit; means through which a portion of said liquid may be tapped from said circuit and for passing the same through an orifice; a chamber having a movable wall of a larger area than that of said orifice; connections between said orifice and said chamber; and means to control the pressure of the liquid passing said orifice, substantially as described.

2. In a device of the character described the combination of a closed liquid circuit including a tank; a loaded valve controlling said circuit; means for circulating a liquid around said circuit; means through which a portion of said liquid may be tapped from said circuit and for passing the same through an orifice; a chamber having a movable wall of a larger area than that of said orifice; connections betweeen said orifice and said chamber; and means comprising a restricting valve in said circuit adapted to control the pressure of the liquid passing said orifice, substantially as described.

3. In a device of the character described the combination of a closed liquid circuit including a tank; a loaded valve controlling said circuit; means for circulating a liquid around said circuit; means through which a portion of said liquid may be tapped from said circuit and for passing the same through an orifice; a chamber having a movable wall of a larger area than that of said orifice; connections between said orifice and said chamber; means to control the pressure of the liquid passing said orifice; means to return said wall after being moved by the liquid entering said chamber; and means for applying the power exerted by the movement of said wall, substantially as described.

4. In a device of the character described the combination of a closed liquid circuit including a tank; a loaded valve controlling said circuit; means for circulating a liquid around said circuit; means through which a portion of said liquid may be tapped from said circuit and for passing the same through an orifice; a chamber having a movable wall of a larger area than that of said orifice; connections including a passage between said orifice and said chamber; means comprising a restricting valve in said passage to control the pressure of the liquid passing said orifice; means to return said wall after it is moved by said liquid in said chamber; and means connected to said wall for applying the power generated by the movements of the same, substantially as described.

In testimony whereof I affix my signature.

WELLINGTON W. MUIR.